Nov. 19, 1968

J. A. LADSTATTER 3,412,372

SONAR MULTIBEAM TRACKING SYSTEM INCLUDING A
DIGITAL 90° PHASE SHIFTER

Filed Feb. 21, 1967

INVENTOR.
JAMES A. LADSTATTER

BY Ernest J Weinberger
Louis B. Applebaum
ATTORNEYS

Nov. 19, 1968    J. A. LADSTATTER    3,412,372
SONAR MULTIBEAM TRACKING SYSTEM INCLUDING A
DIGITAL 90° PHASE SHIFTER
Filed Feb. 21, 1967    3 Sheets-Sheet 2

INVENTOR.
JAMES A. LADSTATTER
BY Ernest J Weinberger
Louis B. Applebaum
ATTORNEYS INVENTOR.
JAMES A. LADSTATTER
BY Ernest J Weinberger
Lorin B. Appleton
ATTORNEYS

United States Patent Office 3,412,372
Patented Nov. 19, 1968

3,412,372
SONAR MULTIBEAM TRACKING SYSTEM INCLUDING A DIGITAL 90° PHASE SHIFTER
James A. Ladstatter, Baldwinsville, N.Y., assignor, by mesne assignments, to the United States of America as represented by the Secretary of the Navy
Filed Feb. 21, 1967, Ser. No. 618,307
1 Claim. (Cl. 340—6)

ABSTRACT OF THE DISCLOSURE

A sonar tracking system including circuitry for providing exact 90° phase shifting of digital signal information which includes passing said signal through a tandem circuit of specific delay means while tapping said means at preselected points therealong. The tapped signals are individually attenuated and all fed into a summer whose output provides a digital signal that is 90° phase shifted from the signal present at the delay center of the delay means.

Background of the invention

This invention relates to phase shift networks, and more particularly to a digital phase shifter which provides an exact 90° shift over an extremely broad frequency spectrum.

Phase shifters for analogue signals which can shift the signal phase approximately 90° over a frequency band are widely known and used. As conventionally constructed, however, these phase shifters generally are limited in frequency range and are not capable of processing digital signals. While the phase shifters of certain embodiments of the present invention are adaptable to processing of analogue signals also, the invention offers particular advantage as applied to digital signal processors affording phase shift of precisely 90°.

Summary of the invention

In certain digital applications, as for example, in anti-correlation circuits, an exact 90° phase shift is necessary over an "infinite" frequency spectrum but variations in amplitude or gain do not affect the basic behavior of the anti-correlator. Here the amplitude response of the phase shifter is not critical and application of the phase shifter is dependent only on the exactness of the degree of shift. In such applications considerable simplification is possible in the implementation of phase shifters in accordance with the invention.

It is therefore an object of this invention to provide an inexpensive, simple, and reliable exact 90° phase shifter adaptable to processing of either analogue or digital signals.

Another object is to provide a digital phase shifter which may be used in an anti-correlation circuit and whose amplitude linearity response is dependent on the number of symmetrical delay stages employed therein.

Other objects and advantages will appear from the following description of an example of the invention, and the novel features will be particularly pointed out in the appended claims.

Description of the preferred embodiments

Figure 1:
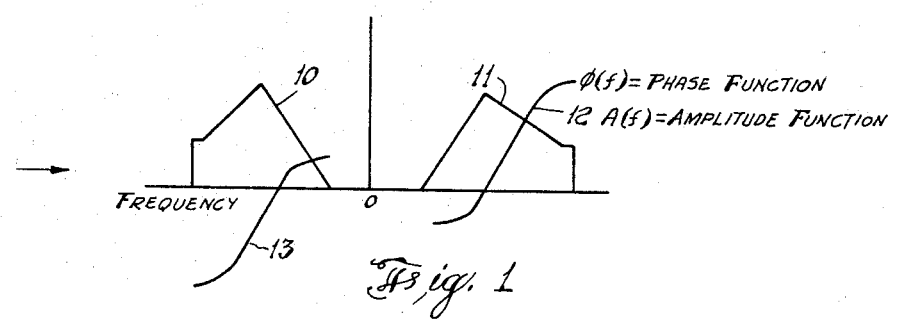
FIG. 1 is a graphic frequency representation of a continuous analogue signal.

FIG. 1 illustrates mathematically the frequency spectrum of a continuous analogue signal. The amplitude functions of this signal, shown as curves 10 and 11, are an even function of frequency, while the phase functions represented by curves 12 and 13 are an odd function of frequency. The amplitude and phase functions together provide a complete representation of the analogue signal.

Figure 2:
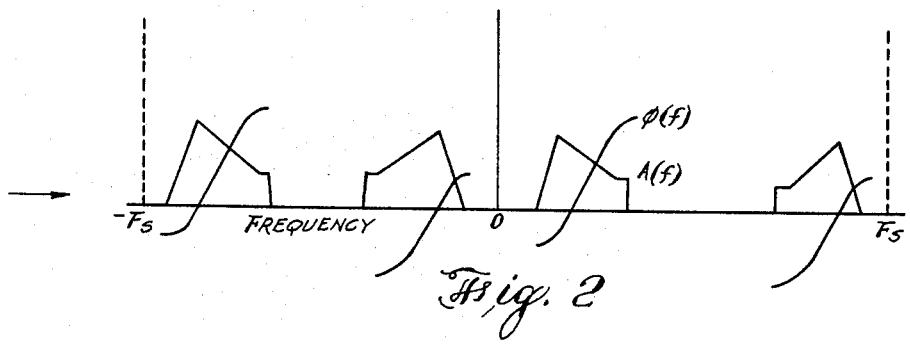
FIG. 2 is a graphic frequency representation of the quantized and digitalized signal of FIG. 1 after sampling.
Figure 3:
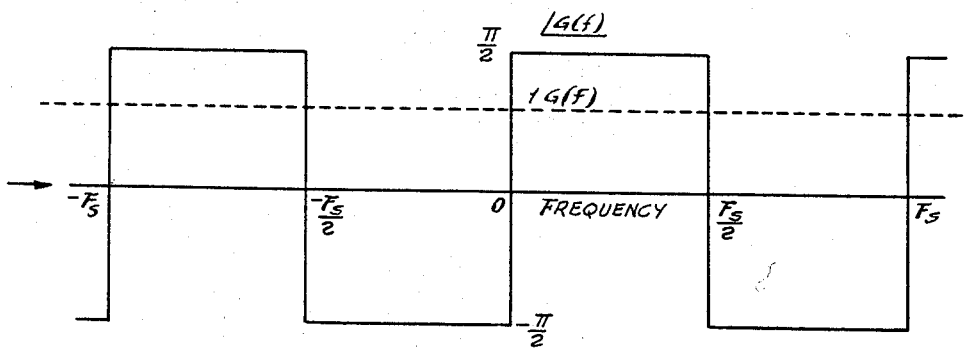
FIG. 3 is a graph showing the transfer function of an ideal 90° phase shifter.
Figure 4:
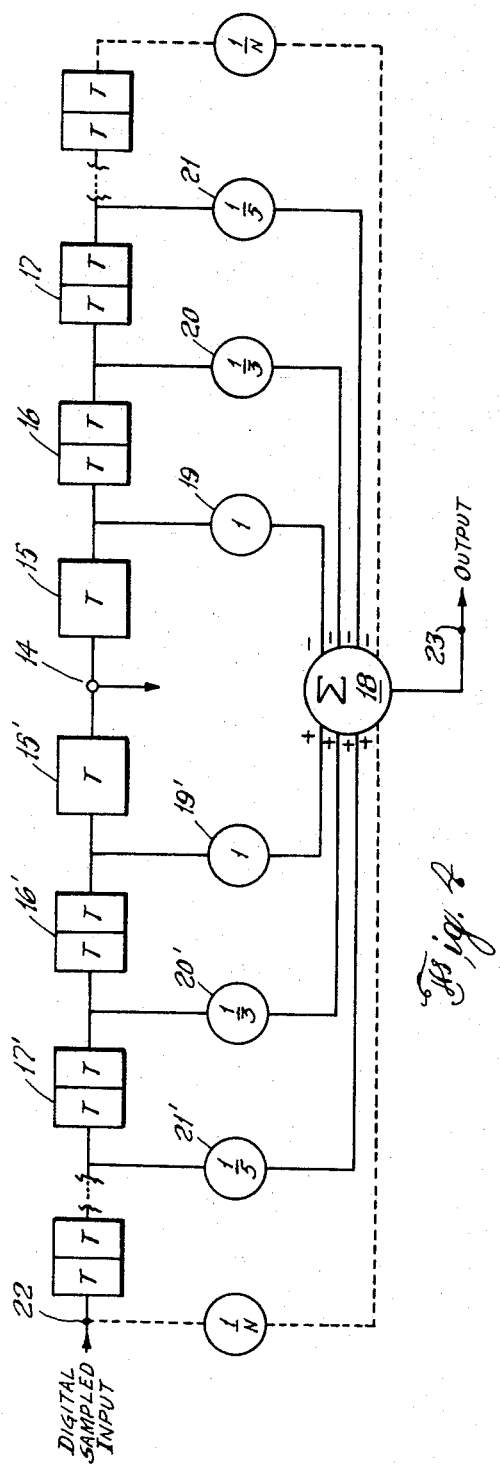
FIG. 4 is a block diagram of an ideal 90° phase shifter in accordance with the principle of this invention.

In order to place this continuous analogue signal in a digital form, the signal is sampled. The resulting sampled signal is shown graphically by way of FIG. 2 and it has a spectrum which is equal to that of FIG. 1 but is repeated at intervals equal to the sampling frequency ($F_s$). $F_s$ is chosen to be equal to at least twice the signal spectrum. Quantizing and digitalizing the sampled signal, as is well known, results in a spectrum which differs somewhat from the sampled spectrum due to the non-linear characteristic of the quantizer. For purposes of this discussion the alteration and changes due to the quantization on the spectrum is not pertinent since the prime consideration herein is to point out that the spectrum of a digital signal is a repetitive or periodic function.

Where it is desired to filter the sampled signal then the filter itself should transfer every period, namely of $F_s$ extent, in an identical manner. This implies that the filter must have a periodic transfer function. Such a transfer function is graphically illustrated by way of FIG. 3 as $\angle G(f)$. Clearly, an ideal 90° phase shifting network would have this transfer function. Mathematically expressing this function we have:

$$G(f) = j; kF_s \leq f < (k+\tfrac{1}{2})F_s$$
$$\text{with } k = -j; \ (k+\tfrac{1}{2})F_s \leq f < (k+1)F_s$$
$$= 0, \pm 1, \pm 2 \ldots$$
and where $j = \sqrt{-1}$ This function, $G(f)$, is similar to a square wave with the exception that it is multiplied by $j$. The Fourier series expansion thereof is then given by:

$$G(f) = B \sum_{n=-\infty}^{\infty} \frac{1}{(2n-1)} e^{-j2\pi f(2n-1)T}$$

where $B$ = a constant gain factor $T = 1/F_s$ = time between samples of the signal. Observation of the exponential term discloses that it is the transfer function of a pure time delay. This in turn reveals that the 90° phase shifter can be synthesized by an infinite series of delay lines, tapped with appropriate weighting factors. Such a circuit arrangement is shown in FIG. 4 where symmetrically arranged about the reference terminal 14 are a set of series connected delay lines 15–17. The delay lines 15 and 15' adjacent the reference terminal 14 provide a delay of time T while all the rest provide a delay equal to twice T. The delay lines may be of the well known passive component type or as is quite suitable may consist of shift registers since the delayed signal is in digital form.

Taps are provided intermediate the delay lines 15–17 as well as a summer means 18. This type of summer is common in the computer art and is capable of processing digital data so as to both add directly and also to subtractively add. The latter process is akin to subtraction or effectively changing the sign (polarity) of one input and then adding the resulting input to one that has not been modified. This is direct subtraction. The taps between the delay lines are connected to the inputs of the summer 14 via attenuator means 19–21. These attenuators reduce the signal amplitude to the summer 18 by a factor which is the amplitude coefficient of the Fourier series expansion for a square wave. In this case the attenuation factor would be equal to the inverse of twice the tap number minus one ($2n-1$). Stated another way, it is the inverse of the number of T delays between that tap and the reference terminal. The attenuators 19–21 can also be provided to reverse the digital signal input thereto so that the summer can be a purely additive device, as for example, a summing bar. Clearly, by employing a larger number of attenuators, the synthesis can be made more exact.

The digitally sampled input signal is applied to an input terminal 22 which is also the input to the delay line most distance from the reference terminal 14 while the output is derived from the summer means 18 output 23. The exact 90° phase shift, however, exists between the signal at the reference terminal 14 and the summer output 23. The signal at terminal 14 is merely a delayed version of the input signal at terminal 22 and therefore, the phase relationship between the terminals 14 and 23 is suitable for the phase shifting function.

Figure 5:
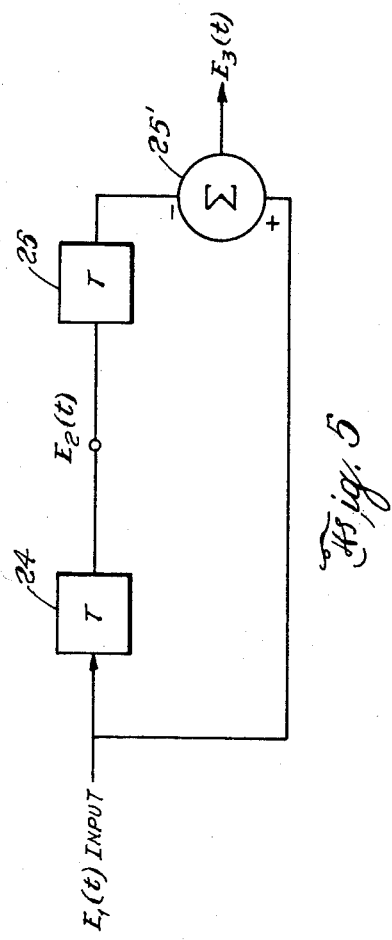
FIG. 5 is a block diagram of the simplest form of the 90° phase shifter made in accordance with the principle of this invention.

Since in most cases it is not practical to employ a large number of delay lines, a simple embodiment made in accordance with the principle of this invention is illustrated in FIG. 5. This embodiment employs only two tandem or series delay means 24 and 25, which may be either delay lines or shift registers, with the input of one such delay means (24) providing one input for subtractive summer 25' and the other input therefor derived from the output of the other delay means 25. The type of summer employed, as well as the type of delay means, depends upon whether the input signal is digital or analogue.

Figure 6:
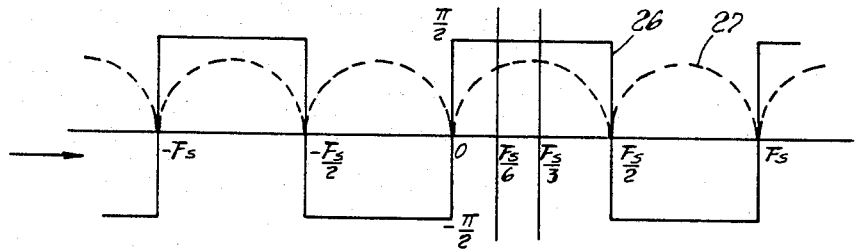
FIG. 6 is the transfer function of the 90° phase shifter of FIG. 5.
Figure 7:
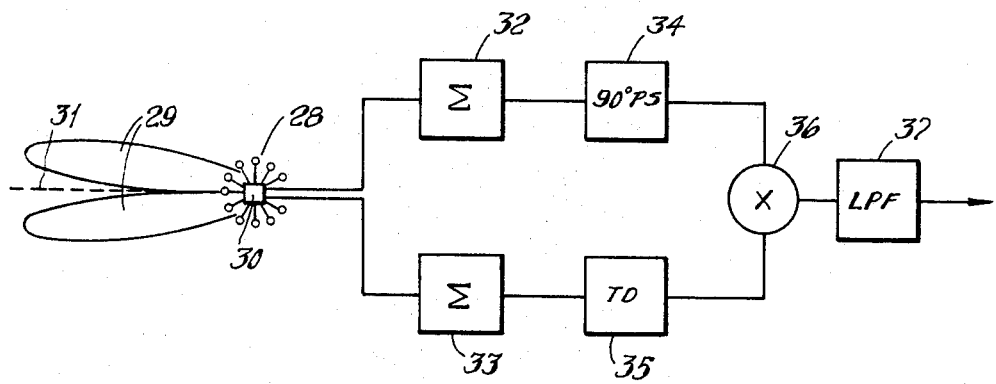
FIG. 7 is a block representation of a typical multibeam sonar signal processing system.

FIG. 6 shows an ideal transfer function 26 plotted on a frequency spectrum having shown therewith the actual transfer function 27 of the arrangement shown in FIG. 5. It can be seen that if the frequency band of interest (in the base band) is limited to some region as $F_s/6$ to $F_s/3$ the amplitude modification is small. Further, by providing additional delay lines and weighting circuits the particular amplitude response desired can be approximated to the degree necessary.

In order to illustrate one circuit wherein the phase shifter has been employed, use is made of an existing system such as a sonar transducer array 28 which produces a dual scanning lobe pattern 29. By combining the proper transducers (projectors) or hydrophones into two sets at 30, the lobes are made to converge on a center line 31 so that a source of energy disposed along this line will produce equal signals on each of the projector sets. By switching the projectors the pattern can be made to electrically rotate. Simple consideration discloses that by obtaining a null or zero output any source detected is known to lie along the center line 31. In order to accurately determine this null, it has been found that anti-correlation of the two projector set outputs provides the desired results. The outputs of the two sets are summed and quantized at 32 and 33 and one of them is applied to a 90° phase shifter 34 which is made in accordance with this invention. The other quantized signal is passed through a delay line 35 which compensates for the delay introduced by the shifter 34. Thereafter the resultant signals are simultaneously applied to the inputs of multiplier 36 and whose output is then fed into a low pass filter 37 which is effectively a digital adder and averages the digital signal.

It will be understood that various changes in the details, materials, and arrangements of parts (and steps), which have been herein described and illustrated in order to explain the nature of the invention, may be made by those skilled in the art within the principle and scope of the invention as expressed in the appended claim.

I claim:

1. In a sonar multibeam tracking system wherein the transducers are electrically arranged to provide a pattern having two lobes and the signals received for the lobes are individually processed, and comprising:
   a pair of digitally quantizing means with the input of one of said quantizing means connected to receive the transducer output corresponding to one lobe and the other quantizing means connected to receive the output corresponding to the other lobe,
   an exact 90° phase shifter connected to receive the output of said one of said quantizing means,
   a time delay means having a delay equal to said shifter, connected to receive the output of said another quantizing means,
   a multiplier connected to receive the output of said shifter and delay means and to digitally multiply the inputs thereof, and
   a digital adder connected to receive the output of said multiplier and to provide an averaged digital signal of the input thereto,
   said phase shifter comprising:
      an input reference terminal,
      a pair of delay means having individual consecutive taps corresponding to delays of $T(2N-1)$ where N is an integer 1, 2, 3 . . .
      said delay means being connected to said reference terminal with the shortest delay proximate said reference terminal,
      individual amplitude attenuation means having the input thereof connected to said taps and of a value to attenuate by a factor equal to the reciprocal of the total delay at said tap, and
      summer means connected to and for subtractively combining the outputs of said attenuation means and having an output terminal,
      whereby said averaged signal is indicative of the direction of a signal source distant from said transducers.

References Cited

UNITED STATES PATENTS

| | | | |
|---|---|---|---|
| 3,050,700 | 8/1962 | Powers | 333—29 |
| 3,054,073 | 9/1962 | Powers | 332—17 |
| 3,307,190 | 2/1967 | Clay et al. | 343—100 |

RICHARD A. FARLEY, *Primary Examiner.*